United States Patent
Maley (10) Patent No.: US 12,379,487 B2
(45) Date of Patent: Aug. 5, 2025

(54) SYSTEM AND METHOD TO RELIABLY DETECT OBJECTS USING CAMERA AND RADAR

(71) Applicant: Caterpillar SARL, Geneva (CH)

(72) Inventor: Jacob C. Maley, Germantown Hills, IL (US)

(73) Assignee: Caterpillar SARL, Geneva (CH)

( * ) Notice: Subject to any disclaimer, the term of this patent is extended or adjusted under 35 U.S.C. 154(b) by 398 days.

(21) Appl. No.: 17/834,285

(22) Filed: Jun. 7, 2022

(65) Prior Publication Data

US 2023/0393267 A1 Dec. 7, 2023

(51) Int. Cl.
*G01S 13/931* (2020.01)
*G01S 13/86* (2006.01)
*G06V 20/58* (2022.01)

(52) U.S. Cl.
CPC .......... *G01S 13/931* (2013.01); *G01S 13/867* (2013.01); *G06V 20/58* (2022.01); *G01S 2013/9327* (2020.01)

(58) Field of Classification Search
CPC .................. G01S 13/931; G01S 13/867; G01S 2013/9327; G01S 15/86; G01S 15/931; G01S 17/86; G01S 17/931; G06V 20/58; G06F 18/256
See application file for complete search history.

(56) References Cited

U.S. PATENT DOCUMENTS

| | | | |
|---|---|---|---|
| 7,065,465 B2 * | 6/2006 | Chen | G06F 18/256 324/614 |
| 9,476,976 B2 | 10/2016 | Kijima et al. | |
| 9,520,040 B2 | 12/2016 | Mavromatis | |
| 9,798,002 B2 | 10/2017 | Baba | |
| 10,145,951 B2 | 12/2018 | Izzat et al. | |
| 10,824,884 B2 | 11/2020 | Dhana Sekaran et al. | |
| 11,091,100 B2 | 8/2021 | Czarnecki | |

(Continued)

FOREIGN PATENT DOCUMENTS

WO     2020127151     6/2020

OTHER PUBLICATIONS

Written Opinion and International Search Report for Int'l. Patent Appln. No.PCT/US2023/025262, mailed Jul. 18, 2023 (14 pgs).

*Primary Examiner* — Vladimir Magloire
*Assistant Examiner* — Yonghong Li (57) ABSTRACT

An object detection system may include a first-type sensing device comprising a camera and defining a first field of view and configured to capture an image stream of an area adjacent to a work machine. The system may also include a second-type sensing device different from the first-type sensing device, defining a second field of view substantially overlapping with the first field of view, and configured to capture a data stream of the area adjacent to the work machine. The system may also include a controller configured to receive a first set of tracks relating to the image stream and including a first confidence level and receive a second set of tracks relating to the data stream and including a second confidence level. The controller may also be configured to combine establish an overall confidence level and determine whether to issue an alert, exercise a machine control, or both.

20 Claims, 7 Drawing Sheets

(56) References Cited

U.S. PATENT DOCUMENTS

| | | | |
|---|---|---|---|
| 2014/0203959 A1* | 7/2014 | Kriel | G06V 20/58 |
| | | | 342/52 |
| 2018/0232947 A1* | 8/2018 | Nehmadi | G01S 7/295 |
| 2019/0065878 A1 | 2/2019 | Zeng et al. | |
| 2021/0072764 A1* | 3/2021 | Kean | E02F 9/205 |
| 2021/0263525 A1 | 8/2021 | Das et al. | |
| 2021/0331695 A1 | 10/2021 | Ramakrishnan et al. | |
| 2022/0111839 A1* | 4/2022 | Jiang | G06T 7/593 |
| 2022/0142035 A1 | 5/2022 | Amann et al. | |
| 2022/0415059 A1* | 12/2022 | Smolyanskiy | G06N 3/0464 |
| 2023/0192145 A1* | 6/2023 | Das | B60W 50/0097 |

* cited by examiner

SYSTEM AND METHOD TO RELIABLY DETECT OBJECTS USING CAMERA AND RADAR

TECHNICAL FIELD

The present application relates generally to work machines such as heavy equipment for construction, farm implements, and other machines adapted for performing work. More particularly, the present application relates to work machines having systems for detecting objects.

BACKGROUND

Moving vehicles, such as automobiles, may be equipped with sensors for sensing other vehicles. For example, blind spot sensors have become a relatively common feature. When another vehicle is positioned in a blind spot, a light on a rear view mirror may illuminate to indicate the presence of the vehicle. Still further, self-driving automobiles that control the vehicle are also being developed. However, automobiles often operate in a somewhat predictable environment because they are designed for operation on roadways that have a generally known geometry with somewhat known surroundings.

Figure 1:
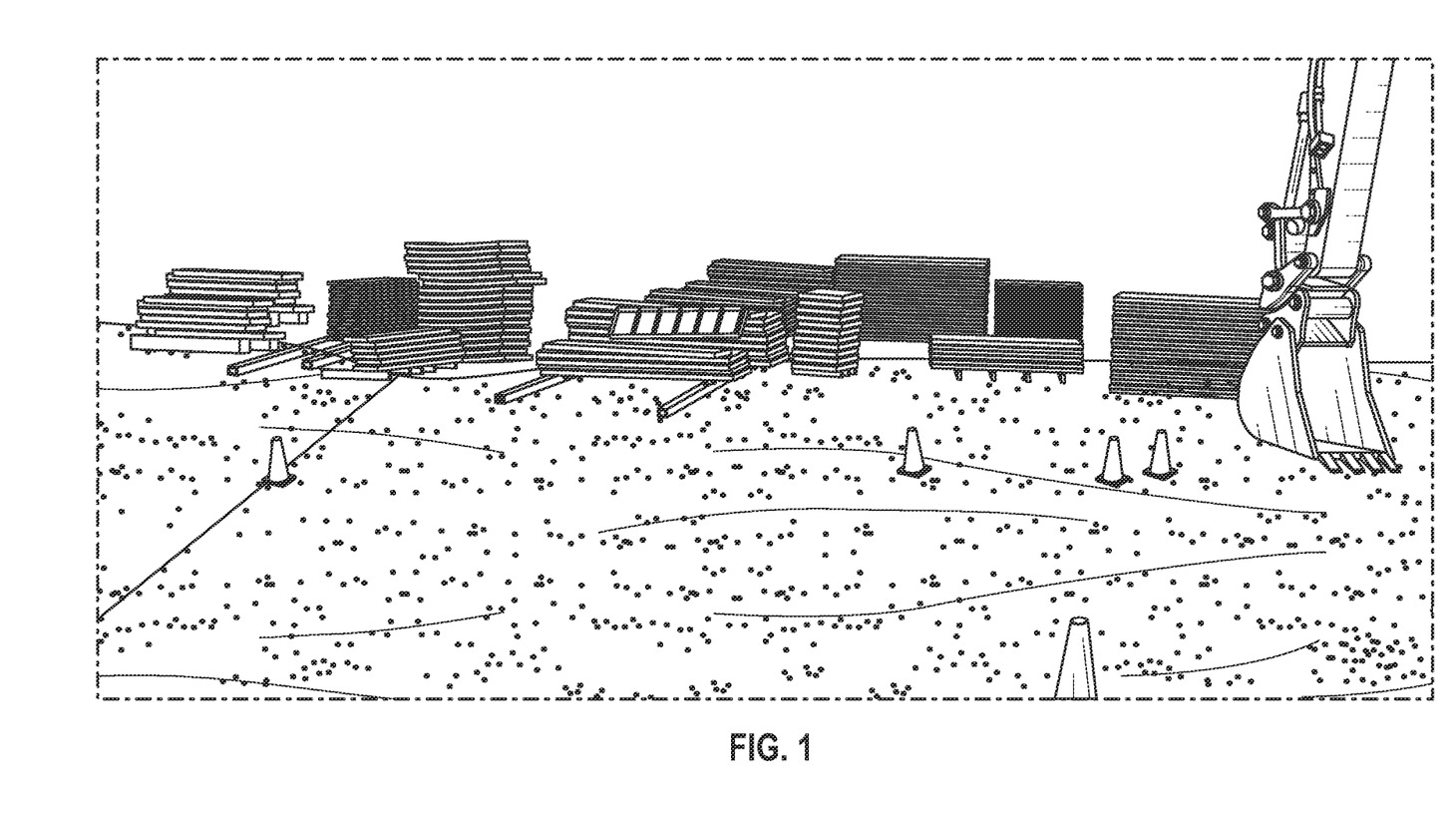
FIG. 1 is a perspective view of a construction site.

In the construction context, the surroundings of vehicles and in particular work machines, are much more unpredictable and vary much more widely. While work machines may operate on roadways and/or on construction trails, as shown in FIG. 1, the environment can also include undefined spaces surrounded or containing other equipment, trailers, construction materials, ground features including hills, holes, cliffs, mounds, piles, people, other vehicles, and/or other obstacles or objects. The varying terrain and surroundings can make it very difficult to provide sensors that provide accurate alerts regarding the surroundings. In situations where vehicle or work machine control is desired, the commonly known sensor systems are not sufficient, generate false positive results, and can cause unnecessary interruptions to work machine operation.

International Patent Application PCT/EP2019/085490 is directed to a method for improved object detection. Title. The invention provides a method for improved object (22) detection based on two types of environment sensors (14, 16) applied in a driving support system (12) of a vehicle (10), whereas the first type of environment sensor is an image type sensor (14) having an image-field-of-view (18) and the second type of environment sensor is a range type sensor (16) having a range-field-of-view (20) that at least partially overlaps the image-field-of-view (18).

SUMMARY

In one or more examples, an object detection system may include a first-type sensing device including a camera and defining a first field of view and configured to capture an image stream of an area adjacent to a work machine. The system may also include a second-type sensing device different from the first-type sensing device, defining a second field of view substantially overlapping with the first field of view, and configured to capture a data stream of the area adjacent to the work machine. The system may also include a controller configured to receive a first set of tracks relating to the image stream and including a first confidence level, receive a second set of tracks relating to the data stream and including a second confidence level and combine the first confidence level with the second confidence level to establish an overall confidence level. The controller may also be configured to determine whether to issue an alert, exercise a machine control, or both.

In one or more examples, a work machine may include a power source arranged on a frame, a traction system operably coupled to the power source to move the work machine, an implement extending from the frame and configured for performing work, and an object detection system. The object detection system may include a first-type sensing device comprising a camera and defining a first field of view and configured to capture an image stream of an area adjacent to a work machine, a second-type sensing device different from the first-type sensing device, defining a second field of view substantially overlapping with the first field of view, and configured to capture a data stream of the area adjacent to the work machine and a controller. The controller may be configured to receive a first set of tracks relating to the image stream and including a first confidence level, receive a second set of tracks relating to the data stream and including a second confidence level, combine the first confidence level with the second confidence level to establish an overall confidence level, and determine whether to issue an alert, exercise a machine control, or both.

In one or more examples, a method of object detection may include receiving a first set of tracks relating to an image stream captured by a first-type sensing device comprising a camera and arranged on a work machine and having a field of view of an area adjacent to the work machine. The first set of tracks may include a first confidence level. The method may also include receiving a second set of tracks relating to a data stream from a second-type sensing device different from the first-type sensing device, arranged on the work machine, and having a second field of view substantially overlapping with the first field of view. The second set of tracks may include a second confidence level and the method may include combining the first confidence level with the second confidence level to establish and overall confidence level. The method may also include determining whether to issue an alert, exercise a machine control, or both.

DETAILED DESCRIPTION

Figure 2:
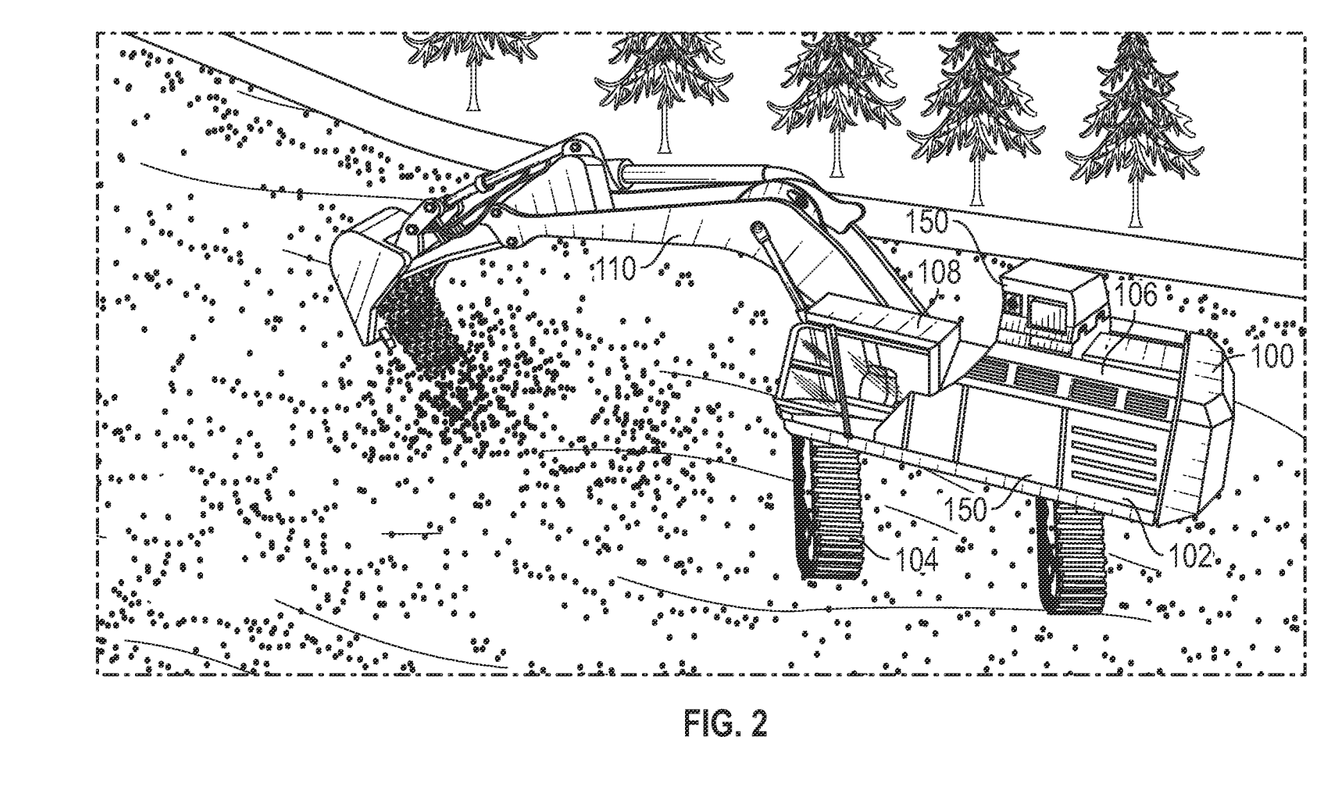
FIG. 2 is a perspective view of a work machine with a first-type sensing device and a second-type sensing device arranged with overlapping fields of view, according to one or more examples.

FIG. 2 shows a work machine 100 equipped with a system for object detection 150, The work machine 100 may be configured for performing work such as excavating, for example. The work machine 100 is illustrated as an excavator in FIG. 2 but can be any other work machine 100 such as a dozer, a compactor, mixer, scraper, motor grader, wheel loader, material hauler, and the like. The work machine 100 may include a frame 102 and a power source 106 arranged on the frame 102, such as an electric motor, combustion engine, or other power source. The work machine 100 may also include a traction system 104 operably coupled to the power source 106 and configured to move the work machine 100 relative to the ground. The traction system 104 may include one or more tracks, wheels, skid feet or other mobility mechanisms. The work machine 100 may also include a control cab or station 108 and an implement 110 controllable from the control cab or station 108. In the present example, the implement 110 may include a series of hydraulically operated booms with a bucket, but as mentioned, the work machine 100 can take a variety of forms with respective implements adapted to perform respective types of work.

Figure 3A:
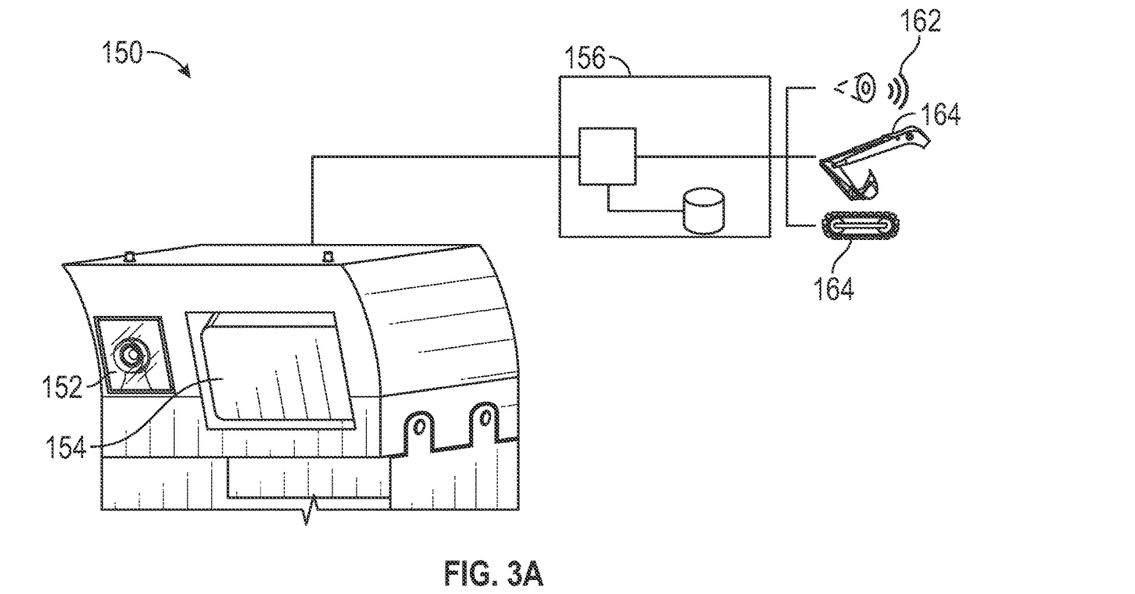
FIG. 3A is a perspective view of an object detection system with a pair of first/second-type sensing devices, according to one or more examples.

With continued reference to FIG. 2, the system for object detection 150 may be configured for detecting objects surrounding the work machine 100 and may be further configured for selectively issuing alerts and/or exercising machine controls depending on the type of objects detected and the locations of those objects. That is, for example, the work machine 100 may issue an alert when debris, equipment, or other inanimate objects are detected and may exercise machine controls when people or other animate objects are detected. Moreover, depending on the location of the inanimate objects or the animate objects, the machine may issue alerts or machine controls. That is, even if an animate object is detected, where it is far enough away, the machine may issue no alert or may issue an alert without a machine control. As shown in FIG. 3A, the system for object detection 150 may include a first type of sensing device 152, which may be a camera or other image-based or photon sensing device, a second type of sensing device 154, which may be a radar, lidar, or ultrasonic radio frequency device, and a controller 156.

Figure 4A:
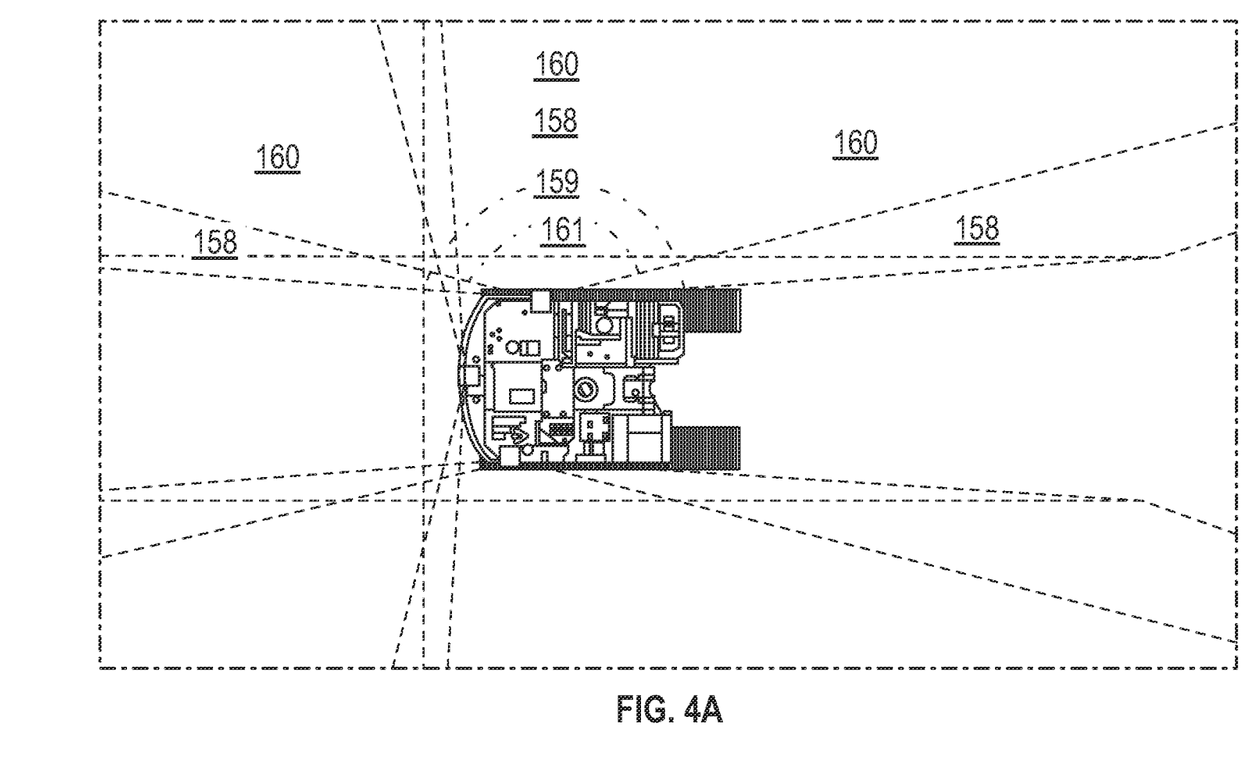
FIG. 4A is a top down view of the work machine of FIG. 2, showing the fields of view of the first-type sensing device and the second-type sensing device, according to one or more examples.

The first type of sensing device 152 may be configured for sensing objects surrounding the work machine 100. In one or more examples, the first type of sensing device 152, may include an image-based or photon sensing device such as a camera. In one or more examples, the camera may be a monocular camera. In other examples, the camera may be a stereo or tri lens/imager camera. The sensing device 152 may be mounted on the work machine 100 and may be directed to capture an image stream of an area on a particular side of the work machine 100 and/or a particular region generally adjacent the work machine 100. In one or more examples, the sensing device 152 may be arranged generally horizontally or in a manner that provides a field of view 158 that includes the supporting ground and an area above the ground. Where the sensing device 152 is mounted at or near a top or otherwise high point on the work machine 100, the sensing device 152 may be arranged to point slightly downward to provide a field of view 158 of the ground and an area above the ground. As shown in FIG. 4A, in one or more examples, the sensing device 152 may be arranged to establish a field of view 158 that has an included angle 159 of approximately 45 degrees to approximately 180 degrees, or approximately 150 degrees to approximately 178 degrees or approximately 165 to approximately 175 degrees. That is, as shown the first type of sensing device 152 may include a camera with a relatively wide-angle lens, for example.

Figure 4B:
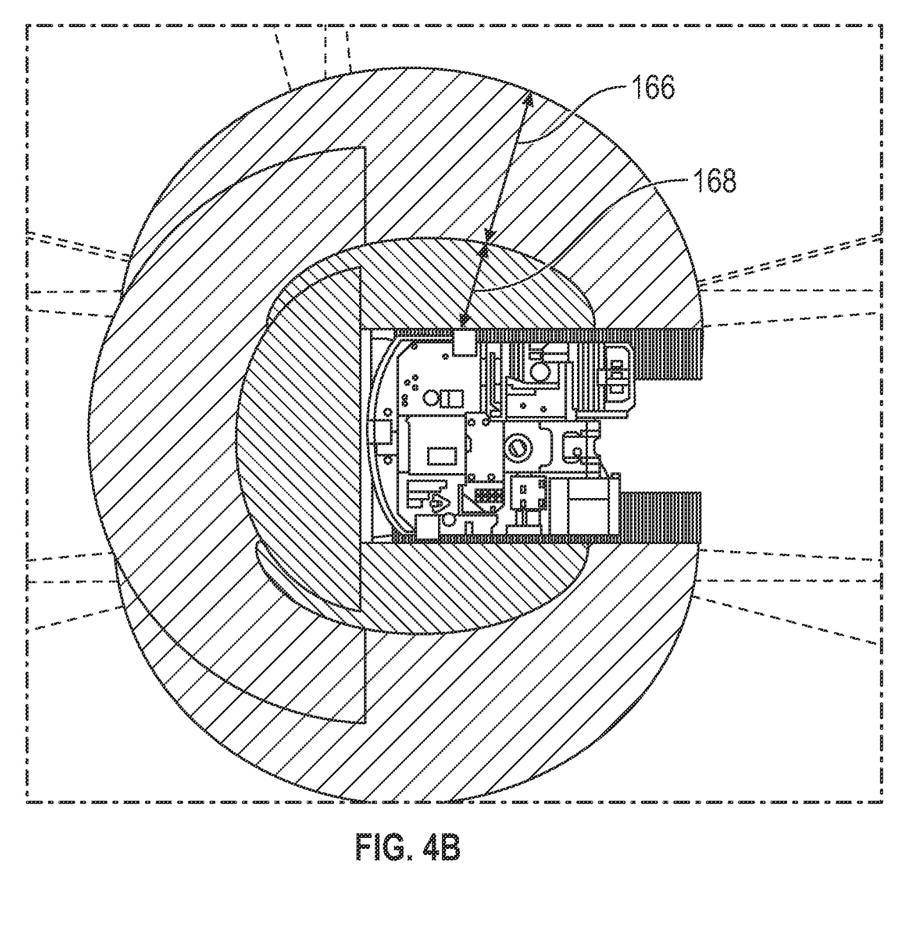
FIG. 4B is a top down view of the work machine and fields of view of FIG. 4A and also including ranges of interest, according to one or more examples.

With continued reference to FIG. 4A, in one or more examples, multiple sensing devices 152 of a first type may be arranged on the machine 100. The multiple sensing devices 152 may be arranged to provide fields of view of respective sides or regions adjacent the work machine 100 and such that respective fields of view 158 of neighboring devices 152 overlap. For example, as shown, a sensing device 152 of a first type may be arranged on each side of the machine 100 and another sensing device 152 of a first type may be arranged on a rear of the machine 100. Each of the side sensing devices 152 may include a field of view 158 that overlaps with a field of view 158 of the sensing device 152 on the rear of the machine 100. While not shown, in one or more examples, still another sensing device 152 of a first type may also be provided on a front of the machine 100. As such, fields of view 158 of the sensing devices 152 may cover substantially all sides of the work machine 100 as shown in FIG. 4 or fields of view 158 may cover all sides of the work machine 100.

The second type of sensing device 154 may also be configured for sensing objects surrounding the work machine 100. In one or more examples, the second type of sensing device 154 may include an electromagnetic active sensing device including a transmitter that emits electromagnetic radiation and a receiver that receives returned electromagnetic radiation. The electromagnetic radiation may include radio waves, for example. That is, the second type of sensing device may be a radar. In one or more examples, the second type of sensing device 1:54 may be a lidar that is used in addition to or as an alternative to radar. Here, the electromagnetic radiation may include laser light. In still other examples, the second type of sensing device 154 may include an ultrasonic radio frequency sensor, which may be used in addition to radar and/or lidar or as an alternative to these types of sensing devices. In any case, the second-type sensing device may be configured to capture a data stream relating to an area adjacent the work machine. Like the first type of sensing device 152, the second type of sensing device 154 may be mounted on the work machine 100 and may be directed to sense objects on a particular side of the work machine 100 and/or a particular region adjacent the work machine 100. In one or more examples, the second type of sensing device 154 may be arranged generally horizontally or in a manner that provides a field of view 160 that includes the supporting ground and an area above the ground. Where the second type of sensing device 154 is mounted at or near a top or otherwise high point on the work machine 100, the second type of sensing device 154 may be arranged to point slightly downward to provide a field of view 160 of the ground and an area above the ground. As shown in FIG. 4A, in one or more examples, the sensing device 154 may be arranged to establish a field of view 160 that has an included angle 161 of approximately 45 degrees to approximately 180 degrees, or approximately 150 degrees to approximately 175 degrees or approximately 160 to approximately 170 degrees. That is, as shown the second type of sensing device 154 may include a radar with a relatively wide included angle, for example.

With continued reference to FIG. 4A, in one or more examples, multiple second-type sensing devices 154 may be arranged on the machine 100. The multiple devices 154 may be arranged to provide fields of view 160 of respective sides or regions adjacent the work machine 100 and such that respective fields of view 160 of neighboring devices 154 overlap. For example, as shown, a second-type sensing device 154 may be arranged on each side of the machine 100 and another second-type device 154 may be arranged on a rear of the machine 100. Each of the side devices 154 may include a field of view 160 that overlaps with a field of view of the device 154 on the rear of the machine 100. While not shown, in one or more examples, a second-type sensing device 154 may also be provided on a front of the machine 100. As such, fields of view 160 of the sensing devices 154 may cover substantially all sides of the work machine 100 as shown in FIG. 4A or fields of view may cover all sides of the work machine 100.

As shown in FIG. 3A, the first and second type of sensing device 152/154 may be combined into a sensing device 150. As shown, for example, the sensing device 150 may include a housing attachable to a surface of the work machine 100 with a bracket. The housing may hold both the first-type sensing device 152 and the second-type sensing device 154, The housing may be adjustable relative to the work machine 100 and the devices 152/154 may each be adjustable relative to the housing. The housing may be a relatively rigid housing made of metal or other relatively strong material to protect the devices 152/154. A sensing device 150 may be provided on one or more sides of the work machine 100 such as two sides or three sides, as shown in FIG. 4A, or all sides of a work machine 100.

Whether provided as part of a combined sensing device 150 or as separate sensing devices, each set or pair of a first-type sensing device 152 and second-type sensing device 154 may be arranged to include overlapping fields of view. As shown in FIG. 4A and described above, in one or more examples, the first-type sensing device 152 and the second-type sensing device 154 of a particular set or pair may have a same field of view or a very similar field of view. As shown in FIG. 4A, fields of view of neighboring sets may also overlap. As discussed in more detail below, particular objects (i.e., animate or inanimate) may be identified at particular ranges from the machine. While the ranges from the machine may be adjustable, in one or more examples, a first range 166 may be an alert range where the machine issues and alert, but might not resort to controlling the machine. This range may be from approximately 2 to approximately 30 meters, or from approximately 3 to approximately 20 meters, or from approximately 4 to approximately 15 meters from the machine. A second range may be an alert/control range 168 where the machine may issue an alert and resort to controlling the machine to avoid contact with the identified object. Again, while adjustable, this range may be from approximately 0 to approximately 6, or from approximately 0 to approximately 4, or from approximately 0 to approximately 3 meters from the machine. Still other distances may be used for the inner and outer boundaries of these ranges and whether to issue an alert or whether to issue and alert and a machine control may also depend on the type of object and the confidence level of the sensing systems.

With reference back to FIG. 3A, the controller 156 may be configured to operate the one or more first-type sensing devices 152 and the one or more second-type sensing devices 154 on the work machine 100. The controller 156 may also be configured to process the image stream, data stream, and/or tracks of data related to the streams received from the devices 152/154 to determine if an object is present, where it is, and/or to categorize the object. The controller 156 may also be configured to determine if an alert should be issued or a machine control should be exercised and, accordingly, issue an alert and/or exercise a machine control adapted to avoid contact between the work machine 100 and the object. The controller 156 may include a computing device including a processor, a computer-readable storage medium, and one or more inputs and outputs. The computer-readable storage medium may include machine readable instructions for one or more algorithms to operate the one or more devices 152/154, receive and process the data captured by them, and generate one or more outputs. The storage medium can include short-term and/or long-term memory and can be volatile and/or non-volatile. Examples of non-volatile storage elements include magnetic hard discs, optical discs, floppy discs, flash memories, or forms of electrically programmable memories (EPROM) or electrically erasable and programmable (EEPROM) memories, Examples of volatile memories include random access memories (RAM), dynamic random-access memories (DRAM), static random-access memories (SRAM), and other forms of volatile memories known in the art. The processor may be adapted for executing the machine-readable instructions to operate the one or more sensing devices 152/154, receive and process the data captured by them and generate one or more outputs. As such, the inputs may be particularly adapted to receive data from the one or more sensing devices 152/154 and the outputs may be particularly adapted to issue alerts in the form of sounds or lights 162 and/or may be particularly adapted to exercise machine controls 164. The sounds or lights may be within the cab 108 of the work machine 100 to alert the operator, for example. Machine controls may generally include placing limitations on the operation of the machine 100 and/or actively steering, braking, or controlling the implement of the machine 100 in a particular way. The controller 156 may be part and parcel to the electronic control module (ECM) of the work machine 100 or a separate computing device may be provided.

Figure 3B:
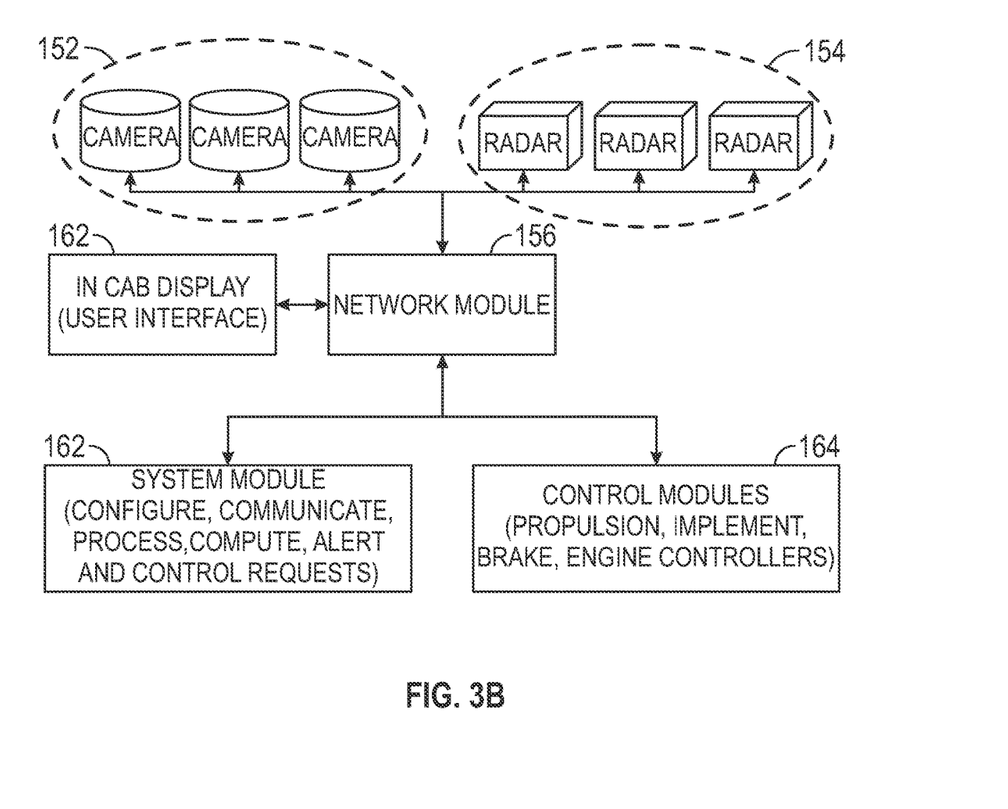
FIG. 3B is a perspective view of the object detection system of FIG. 3A, but including multiple first/second-type sensing devices pairs, according to one or more examples.

While a simplified system with a single pair of sensing devices 152/154 is shown in FIG. 3A, a system with multiple pairs of sensors 152/154 is shown in FIG. 3B. That is, as shown, the overall system may include multiple pairs of cameras and radars, for example. The cameras and radars may capture image streams and data streams, respectively, and data tracks related thereto to the controller 156, which may process the tracks of data to determine whether to do anything, whether to issue an alert 162, and/or whether to exercise a machine control 164. Still other numbers of first/second-type sensing devices 152/154 may be provided.

INDUSTRIAL APPLICABILITY

Figure 5:
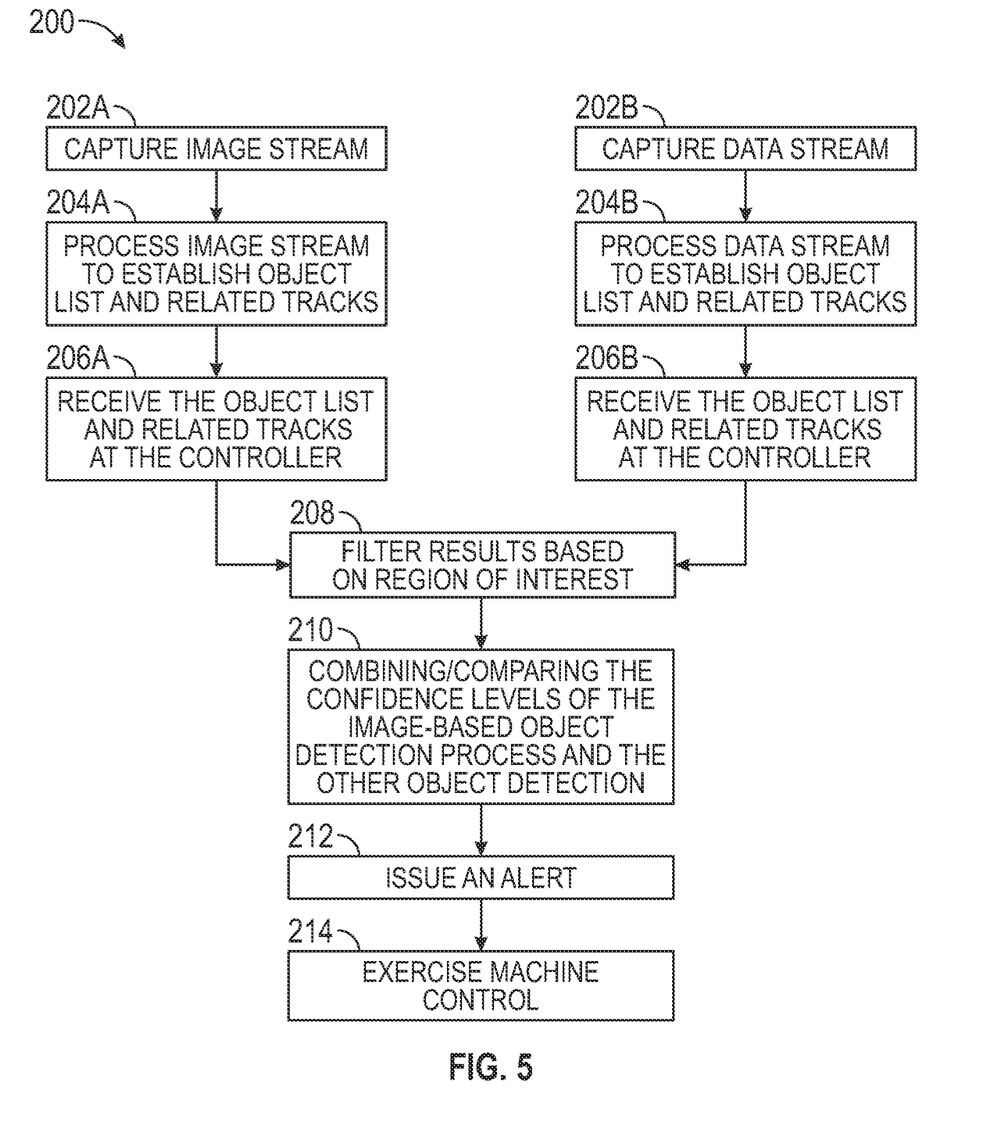
FIG. 5 is a flow diagram depicting a method of using a first-type sensing device and second-type sensing device to reliably detect Objects and control the work machine based on a confidence of the detection.
Figure 6:
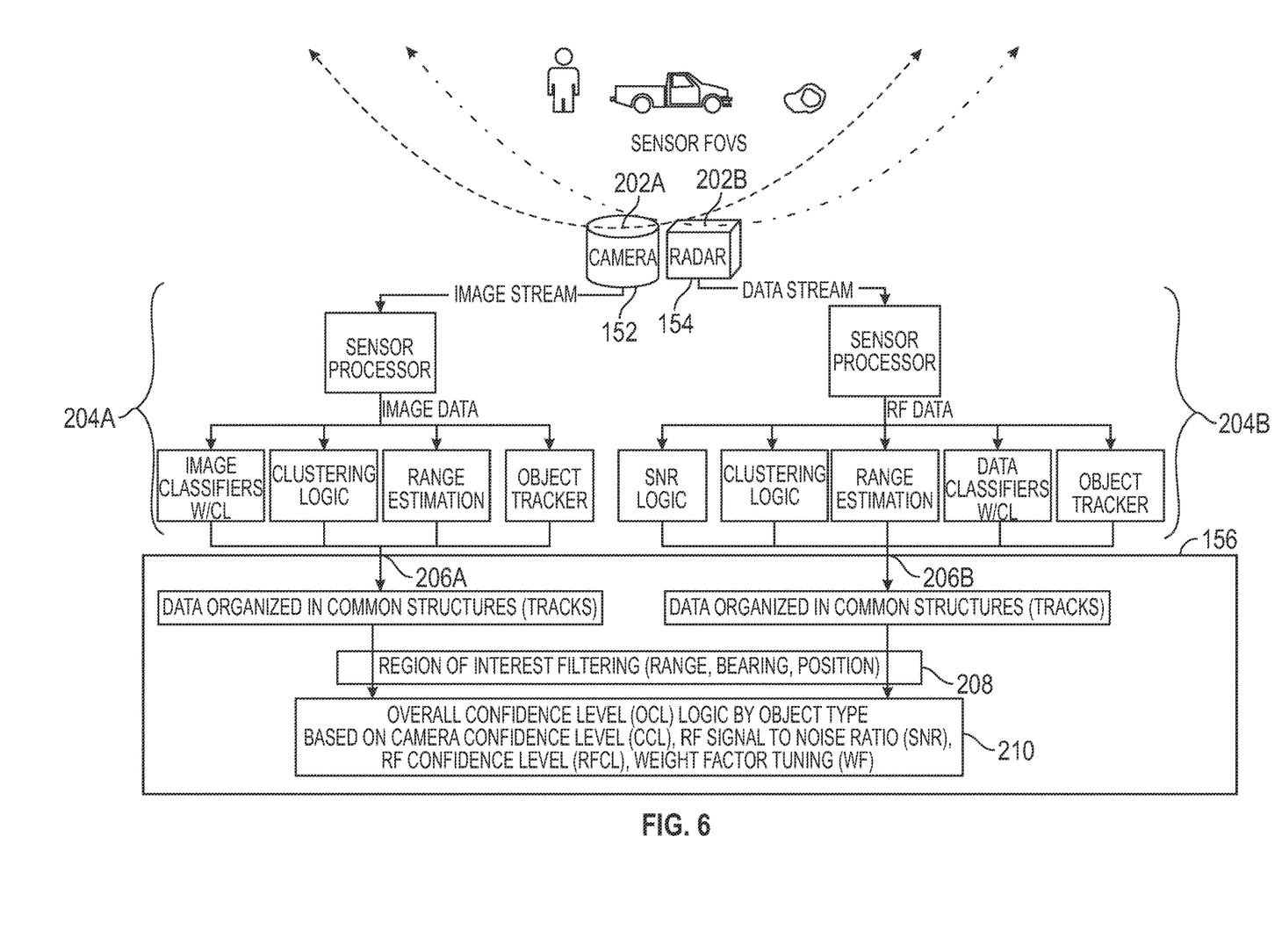
FIG. 6 is an additional diagram depicting aspects of the method of FIG. 5 and the parts performing one or more aspects of the method.

In operation and use, the object detection system 150 may perform a method of object detection 200 as shown in FIG. 5 and particular details of which are shown in FIG. 6. The method 200 may include separately processing an image stream from the first-type sensing device 152 and a data stream from the second-type sensing device 154 and relying on the relationship of respective confidence levels to determine whether to issue an alert 162 and/or to exercise a machine control 164.

As shown, the process associated with the first-type sensing device 152 may include capturing an image stream 202A with the one or more first-type sensing devices 152 on the work machine 100. The first process may also include processing the image stream at the first-type sensing device, or elsewhere, to establish an object list and related tracks 204A and providing the same to the ECM or other controller. That is, and as shown in FIG. 6, the related tracks may include image classifiers with confidence levels, clustering logic, range estimation, and an object tracker. The ECM or other controller may receive the object list and related tracks from the one or more first-type sensing device 206A.

A similar process may be performed for the second-type sensing device 154. That is, the process may include capturing a data stream with the one or more second-type sensing devices 154 on the work machine. The process may also include processing the data stream at the second-type sensing device, or elsewhere, to establish an object list and related tracks 204B and providing the same to the ECM or other controller. That is, and as shown in FIG. 6, the related tracks may include signal-to-noise ratio logic, clustering logic, range estimation, data classifiers with confidence levels, and an object tracker. The ECM or other controller may receive the object list and related tracks from one or more of the second-type sensing device 206B.

At this point, the controller may have data from both the first-type sensing device and the second-type sensing device organized in common structures (tracks) so that the data from both types of sensing devices may be compared and/or combined, for example. As an initial measure, the method may also include filtering results based on regions of interest 208. For example, depending on the range, the bearing, and/or the position, the detection of an object may be determined to be relevant or not relevant due to the distance from the machine, the direction from the machine, or the position of the object. For example, where an object is detected behind the machine and the machine is moving away from the object, this object may be determined to not be relevant since risk of encountering the object is low unless/until the machine or object changes its direction of travel. Still other examples of relevant/irrelevant object detections may be envisaged based on range, bearing, and position.

The method may also include combining or comparing the confidence levels of the image-based object detection process and the other object detection process to arrive at an overall confidence level 210. The combining may be used to determine whether to take any action at all and whether to issue an alert, exercise a machine control, or both. For example, where the confidence levels of both processes are high and where the object categorization is a human, the system may exercise a machine control to avoid contact between the work machine and the human and may also issue an alert. Where the confidence levels are both low and the object categorization is an inanimate object, the system may not issue an alert or exercise a machine control. Where the confidence levels of both the first and second type devices are relatively high and the object categorization is an inanimate object, the system may issue an alert, but may not exercise machine control. The system may rely on other combinations of confidence levels and object categorizations to determine whether to issue an alert and/or exercise a machine control.

In a particular example, a weighting calculation may be performed as part of the combination process. In one or more examples, the weighting calculations may be based on confidence levels of a particular type of object. That is, an overall confidence level that the detected object was a human may be performed by weighting the confidence level from the first-type device, weighting the confidence level from the second-type device, and summing the two weighted confidence levels. The weight factors in this process may be based on knowledge of the ability of a particular technology to identify the particular type of object in question. That is, more weight may be given to a camera when the object in question is a person because cameras may be somewhat inherently better at identifying people. In addition to the weighting of the confidence levels from each type of device, the signal to noise ratio from the second-type device may also be weighted and summed with the weighted confidence levels. As series of equations for combining the data from a camera and a radar or other type of sensing device may be as follows:

$$OCL(people) = CCL(people) \times wf1 + SNR \times wf2 + RCL(people) \times wf3 \qquad \text{I.}$$

$$OCL(passenger\ vehicles) = CCL(passenger\ vehicles) \times wf1 + SNR \times wf2 + RCL(passenger\ vehicles) \times wf3 \qquad \text{II.}$$

$$OCL(machines) = CCL(machines) \times wf1 + SNR \times wf2 + RCL(machines) \times wf3 \qquad \text{III.}$$

$$OCL(infrastructure) = CCL(infrastructure) \times wf1 + SNR \times wf2 + RCL(infrastructure) \times wf3 \qquad \text{IV.}$$

where,
 OCL=Overall Confidence Level
 CCL Camera. Confidence Level
 SNR=Signal-to-Noise Ratio
 RCL=Radar Confidence Level
 wf1, wf2, wf3=weight factors 1, 2, and 3

Individual weight factors may be tuned by object type and position. Moreover, overall confidence levels may be a finite value or relative percentage with higher values or percentages needed before requesting an operator alert or machine control/inhibit. It is noted that infrastructure may include items such as poles, utilities, building, etc. As an example, if the work machine comes upon an actual person, the overall confidence level for identification of a person may be based on a track ID(n) with a CCL (people) of 90%, a SNR of 80%, and a. RCL (people) of 60% which is a relatively high score. However, should the work machine come upon a large boulder, the overall confidence level for identification of a person might have a track ID(m) with a CCL (people) of 30%, a SNR of 50%, and a RCL (people) of 40% which is a relatively low score for a possible person. As such, the work machine may take action accordingly. It is to be appreciated that people may be considered animate objects, while infrastructure may be considered inanimate objects. In one or more situations, passenger vehicles and machines may be considered animate or inanimate depending on whether they are actively moving or are stationary.

When the system determines that an alert should be issued, the system may issue the alert 212. For example, the system may illuminate a light, activate an alert on a display, sound an alarm, generate a vibration, or otherwise generate an alert for the operator of the work machine. When the system determines that a machine control should be exercised, the system may exercise the control 214. For example, the system may inhibit particular operations of the machine and/or may actively control one or more parts of the machine to avoid contact with the object. For example, inhibiting particular operations may include preventing swing of the machine, operation of the traction system, operation of the implement, or operation of other features of the work machine. Still other machine limitations may be applied. Moreover, inhibiting particular operations may be specific to avoiding contact with the object and might not fully disable operation of a particular features. For example, preventing swing of the machine may include preventing swinging a particular direction, but allowing swing in an opposite or different direction. That is, the machine controls may be particularly tailored to avoid limiting machine operations that will not or are not likely to cause contact with the object. Actively controlling one or more parts of the machine may include, for example, applying brakes to slow or stop the machine, controlling the steering change the direction of the machine, and/or moving the implement to avoid contact with the object. Still other active controls may be performed by the system.

The present object detection system and its associated method may be advantageous for several reasons. For example, the presence of two sensing devices (e.g., camera and radar) with overlapping fields of view may create redundancy. However, because the sensing devices rely on different types of data, the system may take advantage of the capabilities of both types of devices, which may be reflected by the respective confidence levels of each device. That is, by analyzing the tracks from the two devices separately and in parallel, the two independent results may be generated that allow for a comparison to increase accuracy of the system and avoid interrupting operations unless particular circumstances exist and allowing for many fewer false positive alerts/interruptions.

The above detailed description is intended to be illustrative, and not restrictive. The scope of the disclosure should, therefore, be determined with references to the appended claims, along with the full scope of equivalents to which such claims are entitled.

What is claimed is:

1. An object detection system, comprising:
   a first-type sensing device comprising a camera and defining a first field of view and configured to capture an image stream of an area adjacent to a work machine;
   a second-type sensing device different from the first-type sensing device, defining a second field of view substantially overlapping with the first field of view, and configured to capture a data stream of the area adjacent to the work machine; and
   a controller configured to:
   receive a first set of tracks relating to the image stream and including a first confidence level;
   receive a second set of tracks relating to the data stream and including a second confidence level and a signal-to-noise ratio for the second-type sensing device;
   categorize an object in the area adjacent to the work machine as a particular object type,
   establish an overall confidence level by:
      applying different weight factors to each of the first confidence level, the second confidence level, and the signal-to-noise ratio to determine a weighted confidence level, a weighted second confidence level, and a weighted signal-to-noise ratio; and
      summing the weighted first confidence level, the weighted second confidence level, and the weighted signal-to-noise ratio,
      wherein the different weight factors are selectively and dynamically shifted based on the object type; and
   determine whether to issue an alert, exercise a machine control, or both.

2. The object detection system of claim 1, wherein the camera is a monocular camera.

3. The object detection system of claim 2, wherein the second-type sensing device is a radar.

4. The object detection system of claim 2, wherein the second-type sensing device is a lidar.

5. The object detection system of claim 1, wherein the camera is a stereo camera.

6. The object detection system of claim 1, wherein the first-type sensing device comprises a plurality of first-type sensing devices and the second-type sensing device comprises a plurality of second-type sensing devices.

7. The object detection system of claim 6, wherein the plurality of first-type sensing devices and the plurality of second-type sensing devices are arranged in sensing pairs including at least one first-type sensing device and at least one second-type sensing device.

8. The object detection system of claim 7, wherein the sensing pairs comprises three sensing pairs, each pair of the three sensing pairs arranged on a side, a back, and an opposite side, respectively, of the work machine.

9. The object detection system of claim 1, wherein the first confidence level and the second confidence level each include an animate object confidence level and an inanimate object confidence level.

10. The object detection system of claim 1, wherein the first confidence level and the second confidence level each include a human confidence level and a non-human confidence level.

11. The object detection system of claim 1, wherein the controller is further configured to issue the alert and exercise the machine control based on what the controller determines to do.

12. The object detection system of claim 11, wherein the controller is configured to issue an alert and exercise a machine control when the overall confidence level for a human is approximately 60% or higher.

13. The object detection system of claim 11, wherein the controller is configured to issue an alert and exercise a machine control when the overall confidence level for an object is approximately 60% or higher.

14. The object detection system of claim 11, wherein the controller is configured to issue an alert, but not exercise a machine control when the overall confidence level for a human is approximately 40% or lower.

15. The object detection system of claim 11, wherein the controller is configured to issue an alert, but not exercise a machine control when the overall confidence level for an object is approximately 40% or lower.

16. A work machine, comprising:
   a power source arranged on a frame;
   a traction system operably coupled to the power source to move the work machine;
   an implement extending from the frame and configured for performing work; and
   an object detection system, comprising:
      a first-type sensing device comprising a camera and defining a first field of view and configured to capture an image stream of an area adjacent to the work machine;
      a second-type sensing device different from the first-type sensing device, defining a second field of view substantially overlapping with the first field of view, and configured to capture a data stream of the area adjacent to the work machine; and
      a controller configured to:
         receive a first set of tracks relating to the image stream and including a first confidence level;
         receive a second set of tracks relating to the data stream and including a second confidence level and a signal-to-noise ratio for the second-type sensing device;

categorize an object in the area adjacent to the work machine as a particular object type;
establish an overall confidence level by:
applying different weight factors to each of the first confidence level, the second confidence level, and the signal-to-noise ratio to determine a weighted first confidence level, a weighted second confidence level, and a weighted signal-to-noise ratio; and
summing the weighted first confidence level, the weighted second confidence level and the weighted signal-to-noise ratio,
wherein the different weight factors are selectively and dynamically-shifted based on the object type; and
determine whether to issue an alert, exercise a machine control, or both.

17. The work machine of claim 16, wherein the first-type sensing device comprises a plurality of first-type sensing devices and the second-type sensing device comprises a plurality of second-type sensing devices.

18. The work machine of claim 17, wherein the plurality of first-type sensing devices and the plurality of second-type sensing devices are arranged in sensing pairs including at least one first-type sensing device and at least one second-type sensing device.

19. A method of object detection, comprising:
receiving a first set of tracks relating to an image stream captured by a first-type sensing device comprising a camera and arranged on a work machine and having a field of view of an area adjacent to the work machine, the first set of tracks including a first confidence level;
receiving a second set of tracks relating to a data stream from a second-type sensing device different from the first-type sensing device, arranged on the work machine, and having a second field of view substantially overlapping with the first field of view, the second set of tracks including a second confidence level and a signal-to-noise ratio for the second-type sensing device;
categorizing an object in the area adjacent to the work machine as a particular object type;
establishing an overall confidence level by:
applying different weight factors to each of the first confidence level, the second confidence level, and the signal-to-noise ratio to determine a weighted first confidence level, a weighted second confidence level, and a weighted signal-to-noise ratio; and
summing the weighted first confidence level, the weighted second confidence level, and the weighted signal-to-noise ratio,
wherein the different weight factors are selectively and dynamically shifted based on the object type; and
determining whether to issue an alert, exercise a machine control, or both.

20. The method of claim 19, further comprising issuing the alert, exercising the machine control, or both, based on the determining step.

* * * * *